Patented July 16, 1929.

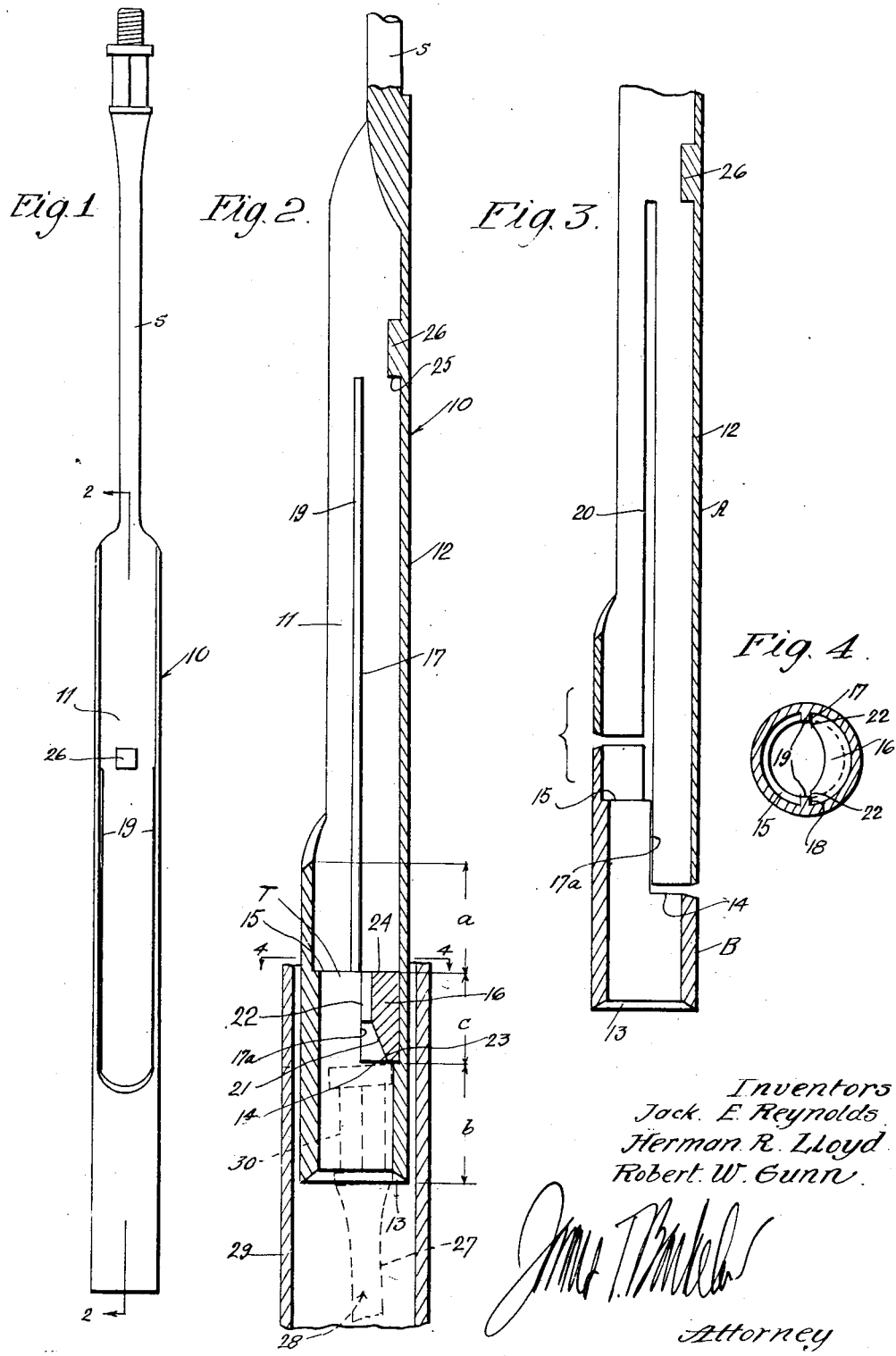

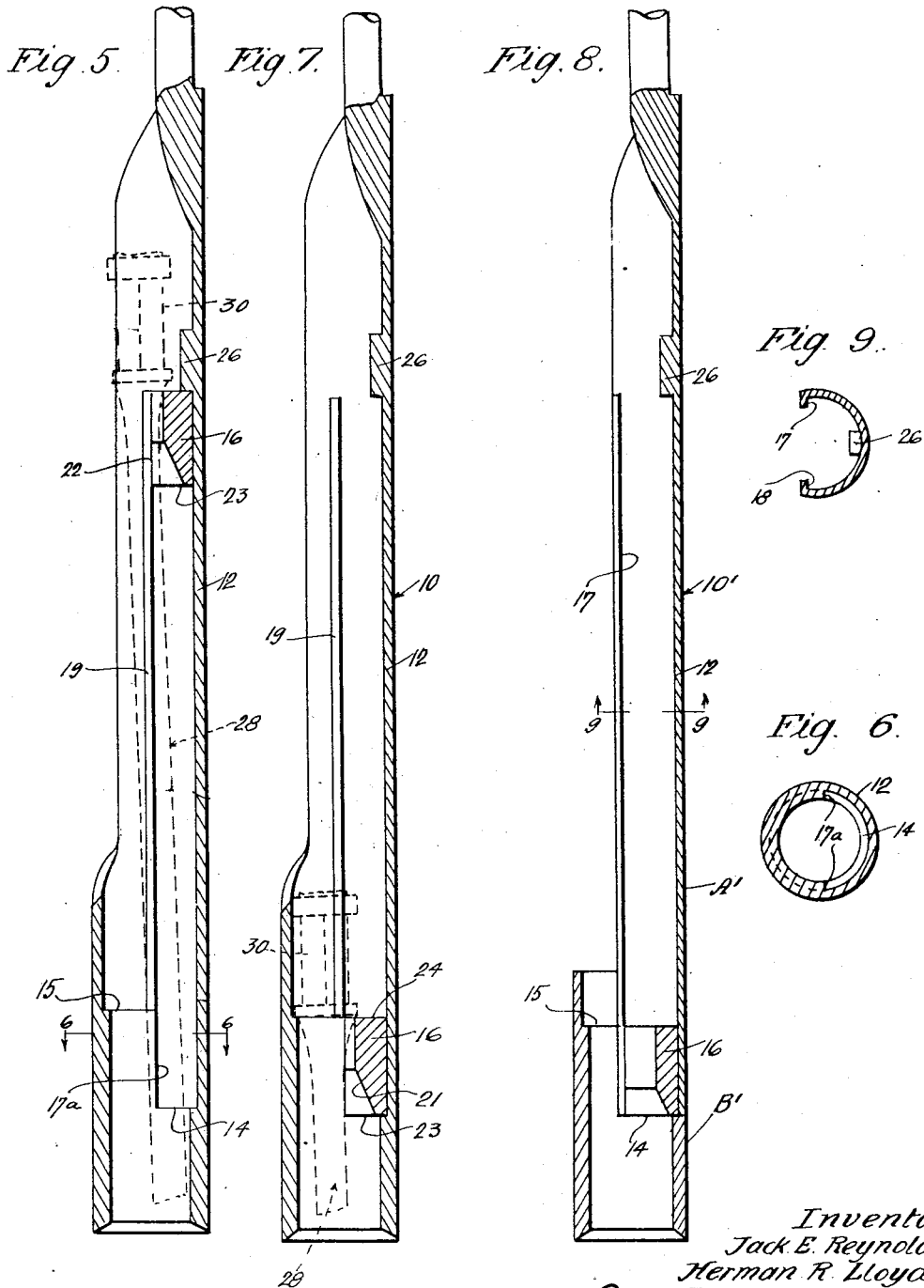

1,720,692

UNITED STATES PATENT OFFICE.

JACK E. REYNOLDS AND HERMAN R. LLOYD, OF TAFT, AND ROBERT W. GUNN, OF LOS ANGELES, CALIFORNIA; SAID GUNN ASSIGNOR TO SAID REYNOLDS AND SAID LLOYD.

SUCKER-ROD FISHING TOOL.

Application filed March 21, 1927. Serial No. 176,890.

This invention has to do generally with fishing tools and is more particularly concerned with grapples suitable for withdrawing broken sucker rods, though not necessarily limited to this specific use.

In a patent granted jointly to Herman R. Lloyd and Jack E. Reynolds, two of the present inventors, on "Sucker rod fishing tool," issued February 16, 1926, No. 1,573,408, there is disclosed a tool of the general character here set forth. However, the present invention has certain features not shown in the patent, and the general effect of these features is to improve the patent tool as to ease and cost of manufacture and efficiency of operation.

We will here outline a few of the more important features, though others may be discussed to better advantage in the following detailed description. In the patented device the movable slip is held against transverse displacement by means of a headed pin adapted to slide through a slot extending longitudinally of the barrel. This slotting of the barrel weakened it so that failures sometimes occurred during operation of the tool, requiring that the tool itself be fished from the hole. Furthermore, this arrangement necessitated an elongation on the slip to carry the slip pin and created certain difficulties of assembly. In contradistinction to this, we have here provided a very simply formed slip which is held from transverse displacement by inwardly projecting, longitudinally extending shoulders on the body member, the shoulders being formed, for instance, either by keys, preferably inset, or by rolling over the cut edges of the barrel.

By virtue of this provision, the barrel remains unweakened, the cost of manufacture and assembly is decreased, and the slips work with greater freedom.

In the patented device, the shoulders in the barrel for limiting slip-movement and for taking the collar of the lost rod were formed by application of a stepped bushing to the barrel bore. It was then difficult to secure the necessary clearances and effective shoulder extent without either making the overall diameter of the tool too large or reducing certain extents of the bore unduly. These conditions we have avoided in the manner set out in detail below.

The shoulder arrangement of the patented device was such that the slip had a projection extending normally below the limit shoulder on the barrel, said projection being adapted to be engaged by the broken rod when the tool was lowered thereover, but there were left two slip shoulders above this projection which might be accidentally engaged by the rod after the slip has been moved upwardly, such engagement tending to prevent proper operation of the tool. Even though this accidental engagement might not often occur, the provision of the several slip shoulders is a manufacturing draw-back.

We have overcome the objectionable features enumerated in the paragraph next above by a novel arrangement which may be set forth to better advantage in the following detailed description, reference being had to the accompanying drawings, in which:

Fig. 1 is an elevation of a tool embodying our invention;

Fig. 2 is an enlarged section on line 2—2 of Fig. 1;

Fig. 3 illustrates one method of making up the barrel of the tool;

Fig. 4 is a section on line 4—4 of Fig. 2;

Fig. 5 is a view similar to Fig. 2 but showing another stage of operation;

Fig. 6 is a section on line 6—6 of Fig. 5;

Fig. 7 is a view similar to Fig. 6, but showing another stage of operation;

Fig. 8 is a sectional view of a variational embodiment of the invention; and

Fig. 9 is a section on line 9—9 of Fig. 8.

In the drawings, the barrel of our device is generally indicated at 10, the upper portion of the barrel being cut away at one side 11 leaving an arcuate shell 12. The extent $a$ of the lower portion of the barrel is of circular cross-section and of relatively large diameter, while extent $b$ which extends upwardly from the inwardly beveled end 13 to a point spaced below extent $a$, is of circular cross-section but of relatively restricted diameter. Extent $c$, intermediate extents $a$, $b$, has the cross-sectional characteristics clearly shown in Fig. 6, there thus being provided upwardly facing spaced, semi-annular shoulders 14 and 15 at the opposite ends of the intermediate extent, which shoulders are at opposite sides of an axial plane of the tool and each of about 180° angular extent. It will be noted that the barrel is unslotted or closed at the side of and above the lower shoulder, contributing greatly to the ultimate strength of the tool.

These variational diameters and resultant shoulders may be readily obtained by making up the barrel from the two parts A and B (Fig. 3) which are welded together after necessary machining has been done on the plain, tubular stock of which part B may be made.

A slip 16 is adapted to slide longitudinally through the shell portion of the barrel at the side diametrically opposite cut-out 11 and to and from extents $a$ and $c$ at the side of the lower shoulder. In order to hold the slip from transverse displacement, I provide a pair of longitudinally extending shoulders 17 and 18 projecting inwardly from the barrel. These shoulders may be provided in any suitable manner; for instance, by keys 19 secured to the barrel or by rolling over the edges of part A' of barrel 10' in Figs. 8 and 9, part B' of this figure being generally similar to part B, as are all the rest of the corresponding elements.

It will be seen that shoulders 17, 17ª, 18, or keys 19 may be considered as means for holding the slip against the barrel above shoulder 14 and for guiding the slip into engagement with said shoulders. Furthermore, taking the axial plane of the barrel which is common to these shoulders or keys as a datum plane, it will be seen that the bore of extent $c$ has, at one side of said plane, a radius equal to the radius of the bore of extent $a$ and, at the opposite side of said plane, a radius equal to the radius of the bore of extent $b$.

When keys 19 are used they may be secured in any suitable manner, though we find it convenient to provide milled-through keyways 20 in which the keys are set and welded with their outer faces flush with the peripheral face of the barrel, full barrel strength thus being maintained.

Preferably, slip 16 is made from semi-cylindrical stock, its peripheral face being in full engagement with the inner face of the barrel, and it is cut centrally to provide an inwardly and upwardly inclining cam face 21 which is of variable curvature from top to bottom. The straight side edges 22 are adapted to engage shoulders 17, transverse displacement of the slip thus being prevented, or, in other words, the slip is so confined by shoulders 17 that throughout its vertical movement it is in alinement with shoulder 14 which may be considered as extending, in effect, angularly from key to key. The longitudinally extending shoulders 17ª extending from shoulder 14 to 15 engage edges 22 to hold the slip from transverse displacement when it is in zone or extent $c$.

Downward movement of slip 16 is limited by the engagement of its lower face or shoulder 23 with internal shoulder 14, while its upward movement is limited by engagement of its top or upper face 24 with downwardly facing shoulder 25 of a stop block 26 welded or otherwise suitably secured to the barrel.

Slip 16 normally rests in its lowermost position (Fig. 2) the parts preferably, though not necessarily, being so proportioned that shoulder 24 is in line with shoulder 15. The throat T, defined by the barrel and the upper edge of the slip, is of a size to pass, with clearance, the body 27 of a given sucker rod 28 which may be considered lost in tubing 29, barrel 10 being of a diameter to pass with slight clearance through the tubing. However, throat T is restricted below the diameter of the coupling parts 30 of rod 28, though bore extent $a$ is large enough to take such parts with considerable clearance.

As the tool is lowered towards rod 28, bevel 13 guides the rod into the barrel bore, the cam face 21, which may be considered a part of the slip extending radially inwardly beyond or appreciably overhanging shoulder 14, engaging coupling part 30. The slip then remains stationary while the barrel continues down, until coupling part 30 registers with cut-out 11. This cut-out is of a width to allow transverse movement of the coupling parts therethrough, and, under certain conditions, as soon as the coupling part clears extent $a$, the rod swings to the left in Fig. 1 clearing said part from beneath cam face 21 and allowing the slip to drop back to the position of Figs. 2 or 7. Should the transverse movement of the rod not occur as the coupling part moves along shell 12, the slip is held above the coupling part until it is struck by stop 26, (Fig. 5) whereupon further descension of the barrel causes the slip to have positive cam action on the coupling part and swing the latter to the left, as in Fig. 5, until the part clears the slip. Thereupon the slip immediately gravitates to the position of Fig. 7. The barrel may be raised as soon as the slip strikes home on shoulder 14, whether or not it has previously been engaged by stop 26, the body portion of the rod being taken in throat T while the coupling part enters extent $a$ and has down-bearing on shoulders 15 and 24. Consequently, subsequent withdrawal of the barrel, which is controlled from above by rods (not shown) coupled to the upwardly extending shank S, pulls the rod upwardly.

While it is preferable, it is not always necessary that the coupling-part shoulder at 15, nor is it necessary that cut-out 11 extend short of shoulder 15, and therefore such of my claims as do not specify these particularities are not to be considered as limited thereto.

It will be understood the drawings and description are to be considered merely as illustrative of and not restrictive on the broader claims appended hereto, for various changes in design, structure and arrangement may be made without departing from the spirit and scope of said claims.

We claim:

1. In a tool of the character described, a vertical barrel, a pair of longitudinally spaced, semi-annular shoulders extending radially from opposite sides of the barrel into the barrel bore, the barrel being closed at the side of and above the lower shoulder, and a slip movable longitudinally through the barrel into and out of end engagement with the lower shoulder, the upper end of the slip being substantially in horizontal alinement with the upper shoulder when the slip engages the lower shoulder, the slip having a portion extending radially inward an appreciable distance beyond the lower shoulder.

2. In a tool of the character described, a vertical barrel having a portion near its lower end whose bore is circular and a second portion spaced upwardly from the first mentioned portion whose bore is circular and is concentric with but of greater diameter than the first mentioned bore, the portion of the barrel intermediate said first and second mentioned portions having a bore which, at one side of a given axial plane of the barrel, has a radius substantially equal to the radius of the bore of said lower portion and which, at the opposite side of said plane, has a radius substantially equal to the radius of the bore of said upper portion, all in a manner whereby there are formed at the opposite ends of said intermediate portion and at opposite sides of the barrel a pair of vertically spaced, upwardly facing semi-annular shoulders, and a slip movable longitudinally through the barrel into and out of end engagement with the lower shoulder, the upper end of the slip being substantially in horizontal alinement with the upper shoulder when it is in engagement with the lower shoulder.

3. In a tool of the character described, a vertical barrel, a pair of longitudinally spaced shoulders extending radially from opposite sides of the barrel into the bore, the barrel being closed at the side of and above the lower shoulder, a slip movable longitudinally through the barrel into and out of end engagement with the lower shoulder, and means holding said slip in engagement with said closed side of the barrel and guiding the slip into engagement with said lower shoulder, the upper end of the slip being substantially in horizontal alinement with the upper shoulder when the slip is in engagement with the lower shoulder, the slip having a portion extending radially inward beyond the lower shoulder.

JACK E. REYNOLDS.
HERMAN R. LLOYD.
ROBERT W. GUNN.